(12) United States Patent
Sakane

(10) Patent No.: US 10,560,593 B2
(45) Date of Patent: Feb. 11, 2020

(54) IMAGE FORMING APPARATUS

(71) Applicant: KYOCERA Document Solutions Inc., Osaka (JP)

(72) Inventor: Hiroki Sakane, Osaka (JP)

(73) Assignee: Kyocera Document Solutions, Inc. (JP)

(*) Notice: Subject to any disclaimer, the term of this patent is extended or adjusted under 35 U.S.C. 154(b) by 0 days.

(21) Appl. No.: 16/215,059

(22) Filed: Dec. 10, 2018

(65) Prior Publication Data
US 2019/0182394 A1    Jun. 13, 2019

(30) Foreign Application Priority Data
Dec. 13, 2017 (JP) ................. 2017-238940

(51) Int. Cl.
H04N 1/00 (2006.01)
G06K 15/02 (2006.01)
G06F 3/12 (2006.01)

(52) U.S. Cl.
CPC ....... H04N 1/00482 (2013.01); H04N 1/0044 (2013.01); H04N 1/00411 (2013.01)

(58) Field of Classification Search
None
See application file for complete search history.

(56) References Cited

U.S. PATENT DOCUMENTS

| | | | | |
|---|---|---|---|---|
| 2007/0263242 A1* | 11/2007 | Takahashi | .......... | G03G 15/6508 358/1.14 |
| 2011/0038654 A1* | 2/2011 | Yamada | ............. | G03G 15/6585 399/341 |
| 2011/0064436 A1* | 3/2011 | Kimura | .............. | G03G 15/5062 399/67 |
| 2011/0267654 A1* | 11/2011 | Matsunaga | ............ | G03G 15/36 358/3.24 |
| 2013/0064588 A1* | 3/2013 | Akita | .................. | G03G 15/6585 399/341 |
| 2014/0139856 A1* | 5/2014 | Ohk | .................... | G06K 15/1801 358/1.9 |
| 2015/0063886 A1* | 3/2015 | Awamura | ........... | G03G 15/6585 399/341 |
| 2016/0116870 A1* | 4/2016 | Tanaka | ................. | G03G 15/205 399/69 |
| 2018/0004135 A1* | 1/2018 | Sako | .................. | G03G 15/2007 |

FOREIGN PATENT DOCUMENTS

JP    2005-338161    12/2005

* cited by examiner

Primary Examiner — Beniyam Menberu

(57) ABSTRACT

An image forming apparatus includes a display panel, a touch panel on the display panel, a glossiness setting unit, a printing device and a print control unit. The display panel is configured to display a document image as plural divisional areas obtained by dividing the document image by predetermined divisional numbers in primary and secondary scanning directions. The glossiness setting unit is configured to change, in accordance with a user operation to the touch panel, a glossiness setting of the divisional area that includes a position where the user operation was detected by the touch panel. The printing device is configured to fix a toner image corresponding to the document image on a printing paper sheet. The print control unit is configured to cause the printing device to fix the toner image under a fixation condition corresponding to the glossiness settings of the plural divisional areas.

3 Claims, 5 Drawing Sheets

IMAGE FORMING APPARATUS

CROSS-REFERENCE TO RELATED APPLICATIONS

This application relates to and claims priority rights from Japanese Patent Application No. 2017-238940, filed on Dec. 13, 2017, the entire disclosures of which are hereby incorporated by reference herein.

BACKGROUND

1. Field of the Present Disclosure

The present disclosure relates to an image forming apparatus.

2. Description of the Related Art

Recently, high image quality is required to a printer, a multi function peripheral or the like, and user's visuality is considered importantly. For such visuality, "gloss" is an important property.

Although "gloss" is felt differently by people, in general, for a photograph image, high "gloss" causing to feel high quality is appreciated, and for a character (text), low gloss is appreciated because high gloss makes low visuality due to reflection or the like.

For a document image includes different types of plural objects such as character (text) and photograph by mixture, an image forming apparatus runs in a gloss mode different from a normal mode, and controls a fixation speed in accordance with a density distribution in a secondary scanning direction, and thereby produces suitable gloss on each area.

As mentioned, suitable glossinesses are different on a photograph image and on a character (text) image. Further, regarding a photograph image, suitable glossinesses are different on photographic subjects.

However, since the aforementioned image forming apparatus controls a fixation linear velocity in a secondary scanning direction in accordance with an image density distribution, printing may be performed without a suitable glossiness for an object type and/or a photographic subject.

SUMMARY

An image forming apparatus according to an aspect of the present disclosure includes a display panel, a touch panel on the display panel, a glossiness setting unit, a printing device and a print control unit. The display panel is configured to display a document image as plural divisional areas obtained by dividing the document image by predetermined divisional numbers in primary and secondary scanning directions. The glossiness setting unit is configured to change, in accordance with a user operation to the touch panel, a glossiness setting of the divisional area that includes a position where the user operation was detected by the touch panel. The printing device is configured to fix a toner image corresponding to the document image on a printing paper sheet. The print control unit is configured to cause the printing device to fix the toner image under a fixation condition corresponding to the glossiness settings of the plural divisional areas.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
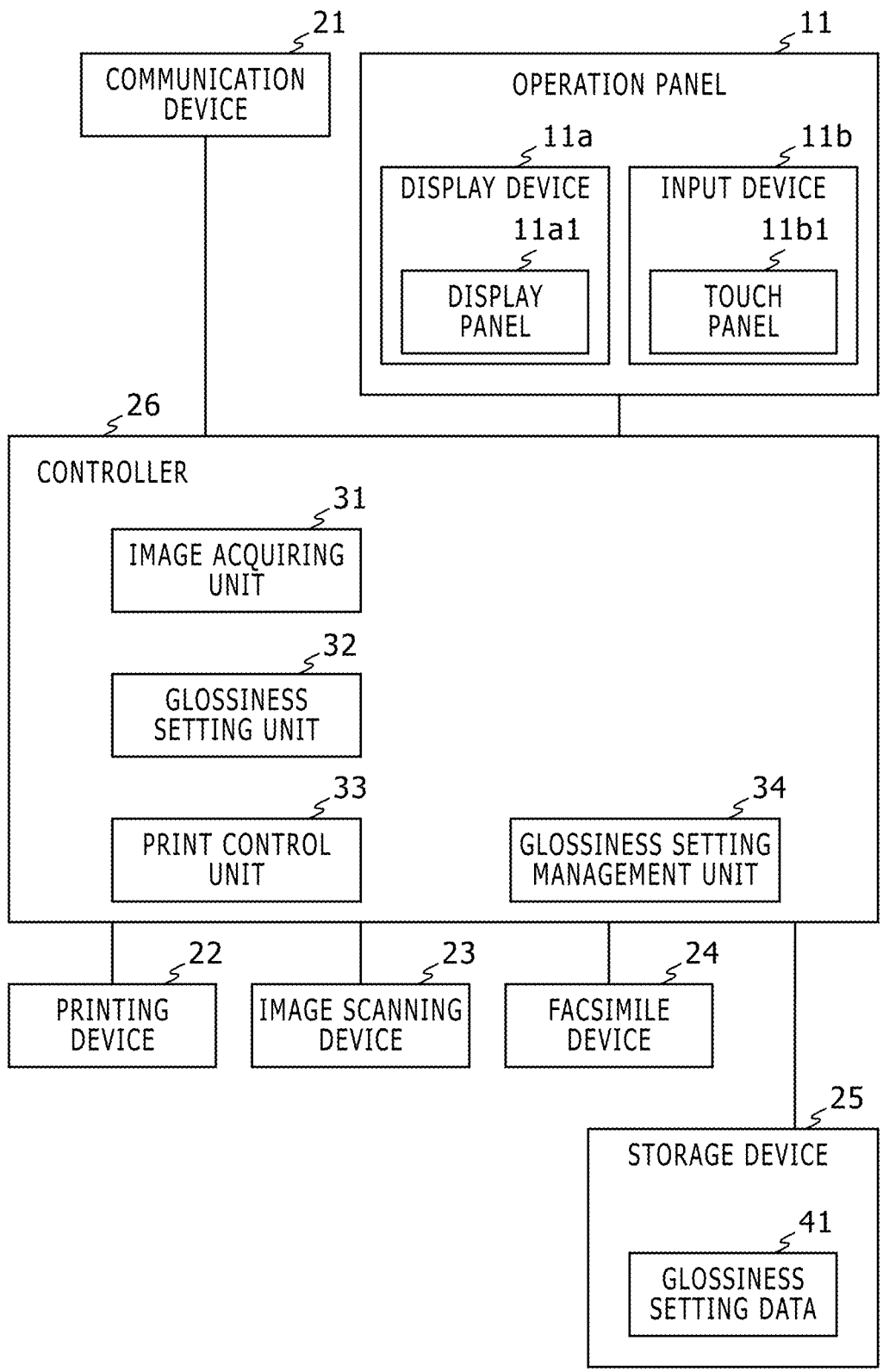
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is a multi function peripheral that has a printing function, an image scanning function, and a facsimile function. This image forming apparatus includes an operation panel 11, a communication device 21, a printing device 22, an image scanning device 23, a facsimile device 24, a storage device 25, and a controller 26.

The operation panel 11 includes a display device 11a that displays an operation screen or the like to a user and an input device 11b that detects a user operation. The display device 11a includes a display panel 11a1 such as a liquid crystal display. The input device 11b includes a touch panel 11b1 arranged on the display panel 11a1.

Further, the communication device 21 is a device capable of connecting through a network or the like to a host device or a server (not shown) and performing data communication in accordance with a predetermined communication protocol.

Furthermore, the printing device 22 is an internal device that prints a document image on a printing paper sheet, for example, in an electrophotographic manner. In this embodiment, the printing device 22 (a) forms on a photoconductor drum an electrostatic latent image corresponding to a document image to be printed using an exposure device, (b) attaches toner to the electrostatic latent image using a development device and thereby develops a toner image corresponding to the document image, (c) transfers the toner image to a paper sheet and (d) fixes the toner image on the paper sheet using a fuser. The fuser applies pressure and heat to the paper sheet using fixing rollers while transporting the paper sheet with a predetermined linear velocity using the fixing rollers.

Furthermore, the image scanning device 23 is an internal device that optically scans a document image from a document, and generates image data of the document image.

Furthermore, the facsimile device 24 is an internal device that has a receiving function that receives a facsimile signal and converts the facsimile signal to image data and a transmitting function that converts image data to a facsimile signal and transmits the facsimile signal.

Furthermore, the storage device 25 is a non volatile storage device such as a hard disk drive or a flash memory, and stores data, a program and the like. The storage device 25 stores glossiness setting data 41. The glossiness setting data 41 indicates default glossinesses corresponding object types.

Furthermore, the controller 26 includes a computer that includes a CPU (Central Processing Unit), a ROM (Read Only Memory), a RAM (Random Access Memory) and the like (not shown), loads a program stored in the ROM or the storage device 25 to the RAM, and executes the program with the CPU to act as various processing units.

In this embodiment, the controller 26 acts as an image acquiring unit 31, a glossiness setting unit 32, a print control unit 33 and a glossiness setting management unit 34.

The image acquiring unit 31 acquires a document image (i.e. image data of a document image) from the image scanning device 23 or the like.

Figure 2:
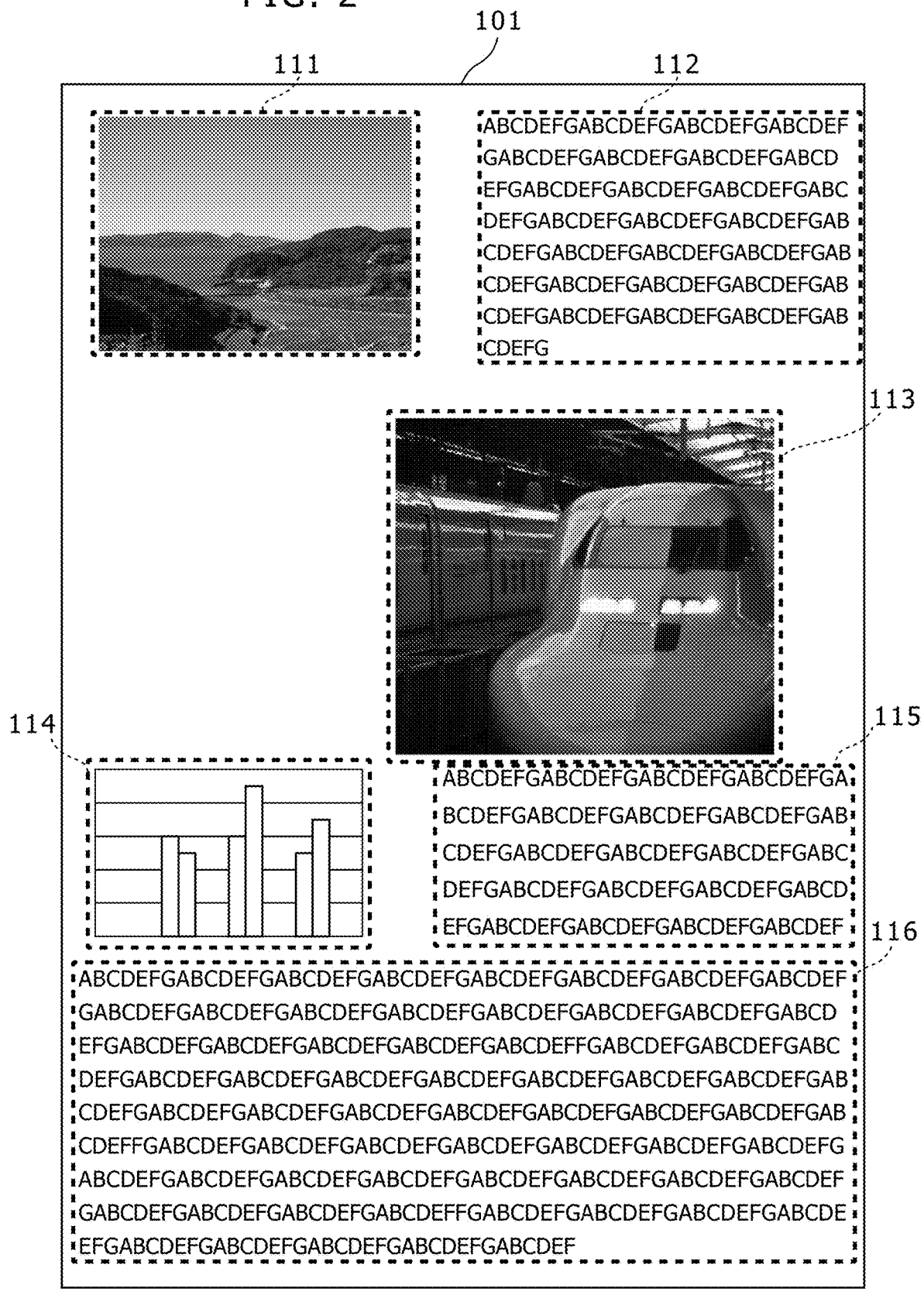
FIG. 2 shows a diagram that indicates an example a document image to be printed.

FIG. 2 shows a diagram that indicates an example a document image to be printed. In FIG. 2, an image 101 to be printed includes six objects 111 to 116. The objects 111 and 113 are photograph images, the object 114 is a chart image, and the objects 112, 115 and 116 are character (text) images. The object 113 is a photograph that includes a highly glossy photographic subject (e.g. a photographic subject having metallic luster or other luster, a photographic subject reflecting light from lighting or the like). The object 111 is a photograph that does not include any highly glossy photographic subjects but includes a low glossy whole photographic subject (e.g. landscape or the like).

The glossiness setting unit 32 (a) causes the display panel 11a1 to display a document image as plural divisional areas obtained by dividing the document image by predetermined divisional numbers in primary and secondary scanning directions, and (b) in accordance with a user operation to the touch panel 11b1, changes a glossiness setting of the divisional area that includes a position where the user operation was detected by the touch panel 11b1.

The print control unit 33 causes the printing device to fix the toner image under a fixation condition corresponding to the glossiness settings of the aforementioned plural divisional areas.

Firstly, for the secondary scanning direction, the print control unit 33 sets a fixation linear velocity, a default fixation temperature and the like corresponding to the glossiness settings of divisional areas arranged along the primary scanning direction; and for the primary scanning direction, the print control unit 33 sets a primary-scanning-directional fixation temperature distribution corresponding to the glossiness settings of the divisional areas arranged along the primary scanning direction, and causes the printing device 22 to fix the toner image on the printing paper sheet with the fixation temperature distribution. Therefore, plural heating elements are arranged along the primary scanning direction so as to be enabled to adjust a temperature of the fixing roller in the fuser at each primary-scanning-directional position, and the aforementioned fixation temperature distribution is obtained by turning on/off such heating elements individually.

In this embodiment, the glossiness setting unit 32 (a) determines object types of the aforementioned plural divisional areas, determines default glossinesses corresponding the determined object types on the basis of the glossiness setting data 41, and causes the display panel 11a1 to display the plural divisional areas in displaying manners (with brightness, color and/or the like) corresponding to the determined default glossinesses, (b) changes, in accordance with a user operation to the touch panel, a glossiness setting from the default glossiness of the divisional area that includes a position where the user operation was detected by the touch panel, and (c) causes the display panel to display the plural divisional areas in displaying manners corresponding to the changed glossiness settings.

For example, the higher glossiness the glossiness setting of the divisional area indicates, the higher the brightness of the divisional area is set. Alternatively, for example, the higher glossiness the glossiness setting of the divisional area indicates, the higher a value of a specific color component (e.g. red component) of the divisional area is set. Consequently, a user can visually confirm a glossiness of each divisional area.

Figure 3:
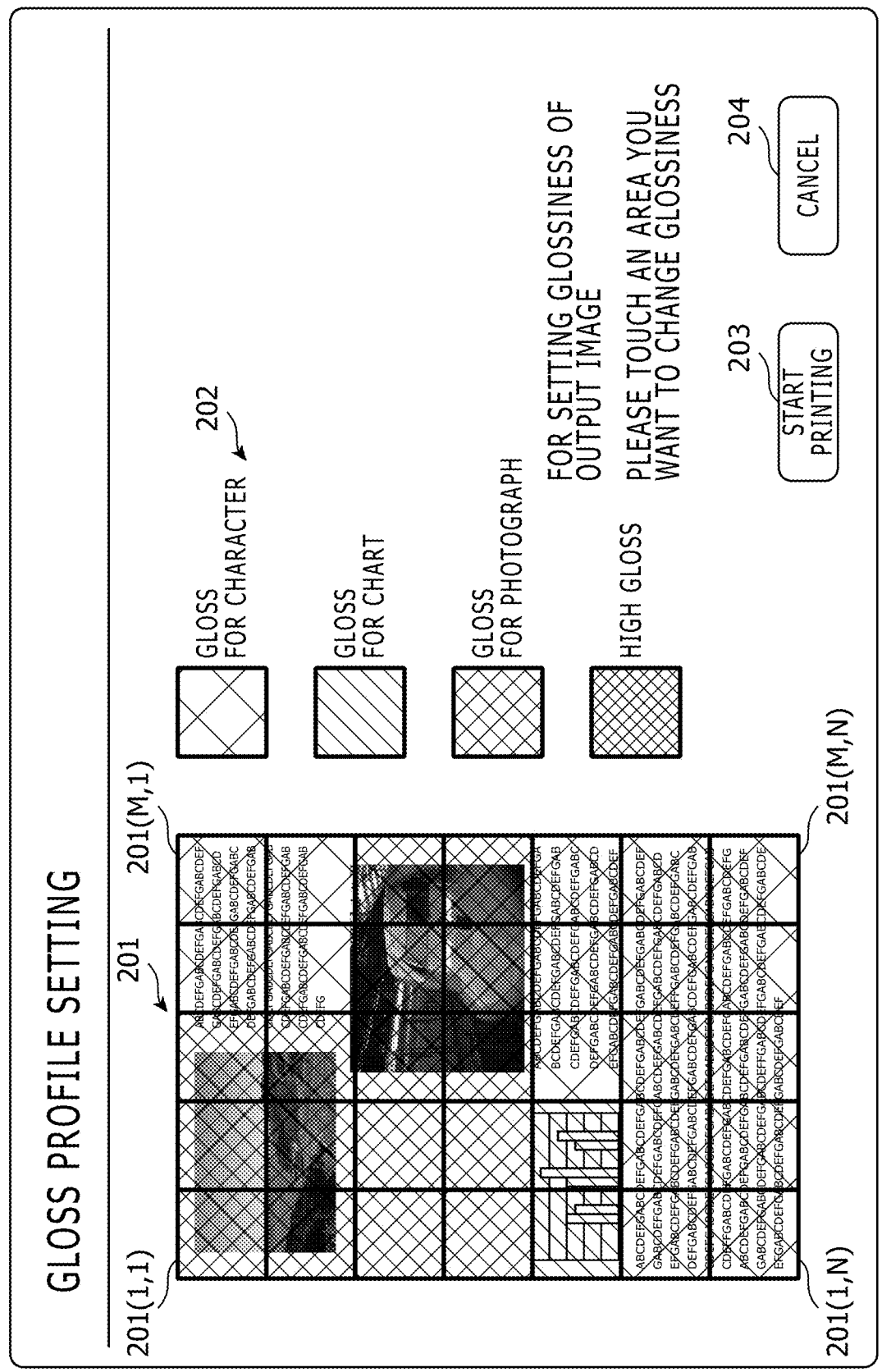
FIG. 3 shows a diagram that explains a gloss profile setting screen (1/2)
Figure 4:
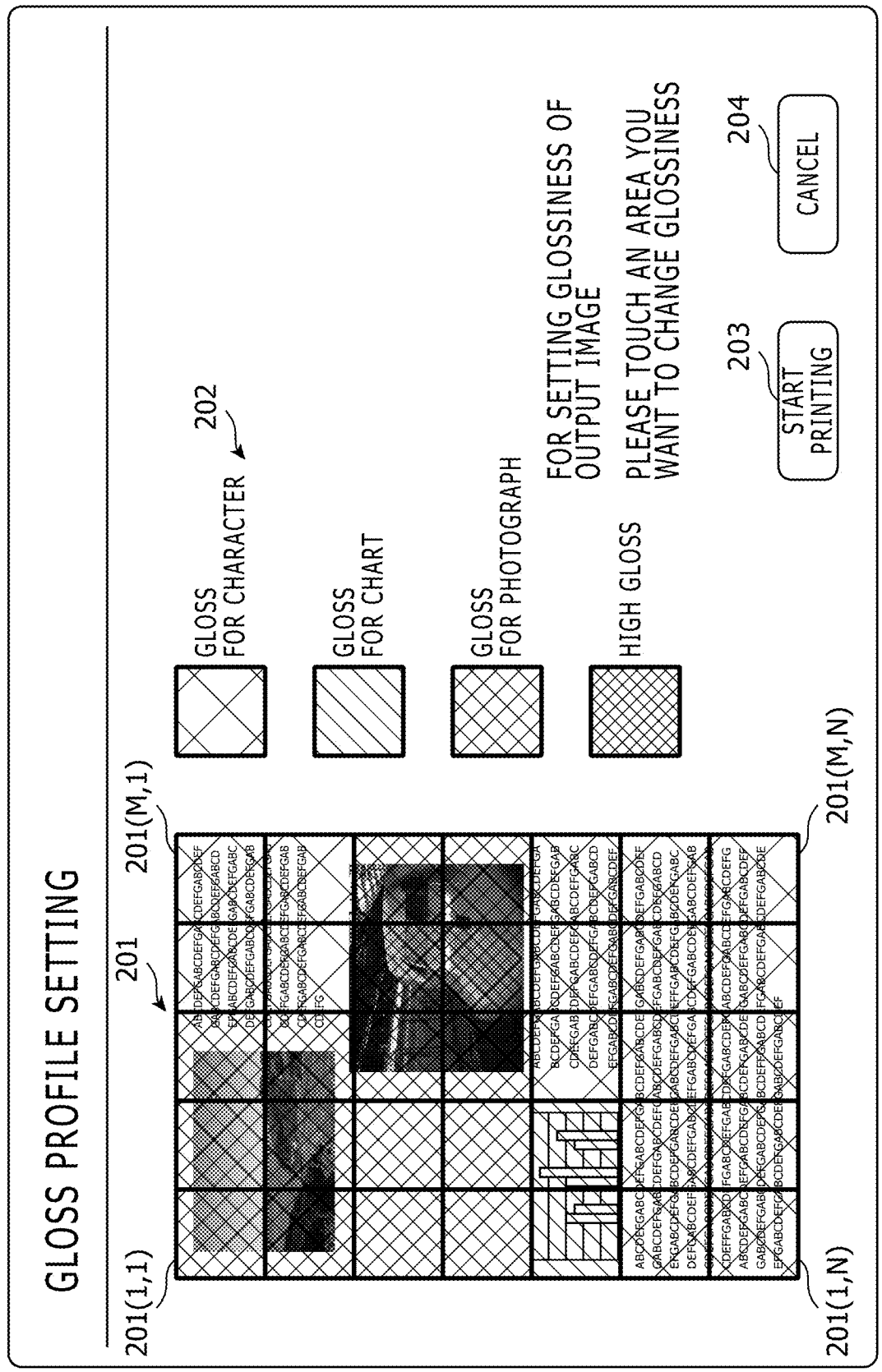
FIG. 4 shows a diagram that explains a gloss profile setting screen (2/2)

FIGS. 3 and 4 show diagrams that explain a gloss profile setting screen.

The glossiness setting unit 32 causes the display panel 11a1 to display a gloss profile setting screen. As shown in FIG. 3, the gloss profile setting screen includes a document image 201 (preview image), a glossiness list 202, a print starting key 203, and a cancel key 204.

The document image 201 is displayed as divisional areas 201(1,1) to 201(M,N), and each divisional area 201(i,j) is displayed in a displaying manner corresponding to a default glossiness of this divisional area 201(i,j). A default glossiness of a divisional area 201(i,j) is set to be identical to a default glossiness of an object type that has the largest area among object types of objects included in this divisional area 201(i,j).

The glossiness list 202 is a list of glossinesses that a user can select for each divisional area 201(i,j), and indicates the displaying manners corresponding to (a) respective glossinesses of object types (in FIG. 3, gloss for character (text), gloss for chart, and gloss for photograph) and (b) high gloss that has a glossiness higher than any of the glossinesses of the object types.

The print starting key 203 is a soft key to apply the current glossiness setting of each divisional area 201(i,j) and start printing of the document image 201.

For example, when the touch panel 11b1 detects a user operation to a divisional area 201(i,j), the glossiness setting of this divisional area 201(i,j) is changed from the default glossiness in accordance with the number of times of the user operation (i.e. number of times of touches) and/or a time length of the user operation (i.e. time length of a touch). For example, in FIG. 3, the glossiness has 4 steps, and every time the divisional area 201(i,j) is touched, the glossiness setting is changed to a higher glossiness by one step.

For example, if each of the divisional area 201(4,3) and the divisional area 201(4,4) is operated one time, then the glossiness settings of the divisional area 201(4,3) and the divisional area 201(4,4) are changed to "high gloss" higher by 1 step from "gloss for photograph" and in accordance with this change of the glossiness settings, the displaying manners of the divisional area 201(4,3) and the divisional area 201(4,4) are also changed as shown in FIG. 4. When the divisional area 201(i,j) currently set as "high gloss" is operated one time, the glossiness setting of this divisional area 201(i,j) may be changed to "gloss for character" as the lowest.

The glossiness setting management unit 34 sets intensities of a default glossiness of each object type and the aforementioned high gloss in accordance with an operation of a specific user such as administrator. Specifically, the glossiness setting management unit 34 updates the glossiness setting data 41 in accordance with an operation of a specific user such as administrator.

Figure 5:
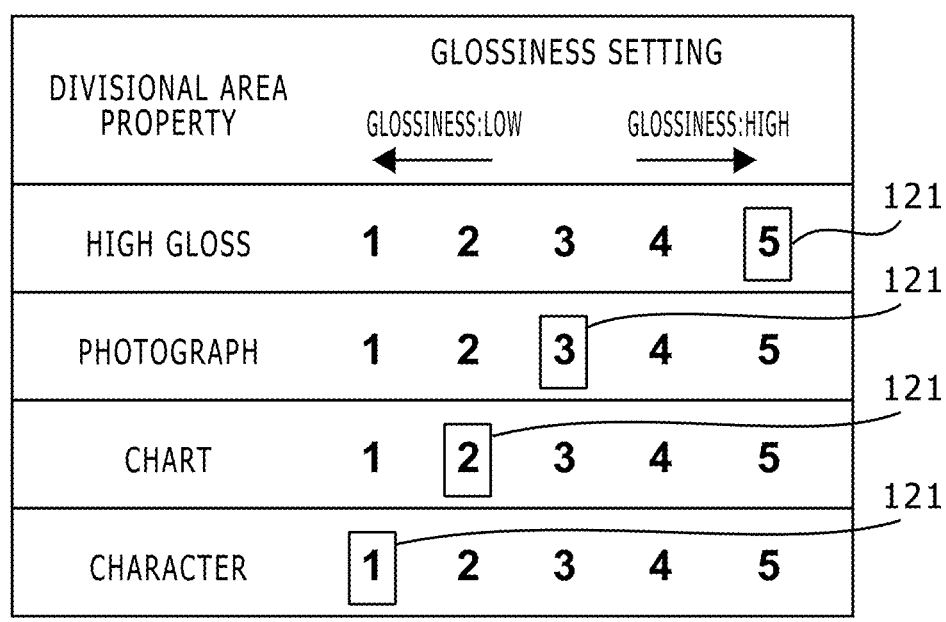
FIG. 5 shows a diagram that indicates an example of a glossiness setting screen.

FIG. 5 shows a diagram that indicates an example of a glossiness setting screen. The glossiness setting management unit 34 causes the display panel 11a1 to display a glossiness setting screen as shown in FIG. 5 for example and display a cursor 121 on a position specified by an operation of the specific user, and sets an intensity corresponding to the displaying position of the cursor 121.

The following part explains a behavior of the aforementioned image forming apparatus.

When printing is performed in accordance with an operation of a user, the image acquiring unit 31 acquires a document image to be printed, and the glossiness setting unit 32 causes the display panel 11a1 to display a gloss profile setting screen as shown in FIG. 3, for example.

While the user sees the document image 201, the user gives an operation to a desired divisional area 201($i,j$) so as to obtain a desired glossiness on a printed matter.

When the touch panel 11b1 detects the user operation, the glossiness setting unit 32 determines a divisional area 201 ($i,j$) that includes a detecting position of the user operation, changes the glossiness setting of this divisional area 201($i,j$) in accordance with this user operation, and also changes the displaying manner of this divisional area 201($i,j$) in accordance with the change of the glossiness setting.

Afterward, when a user operation to the print starting key 203 is detected by the touch panel 11b1, the print control unit 33 applies the current glossiness setting of each divisional area 201($i,j$) to the document image 201 to be printed and causes the printing device 22 to perform the printing of the document image 201.

As mentioned, in the aforementioned embodiment, the display panel 11a1 displays a document image 201 as plural divisional areas 201(1,1) to 201(M,N) obtained by dividing the document image by predetermined divisional numbers M and N in primary and secondary scanning directions. The touch panel 11b1 is arranged on the display panel 11a1. In accordance with a user operation to the touch panel 11b1, the glossiness setting unit 32 changes a glossiness setting of the divisional area 201($i,j$) that includes a position where the user operation was detected by the touch panel 11b1. The print control unit 33 causes the printing device to fix the toner image under a fixation condition corresponding to the glossiness settings of the plural divisional areas 201(1,1) to 201(M,N).

Consequently, printing of the document image is performed with suitable glossinesses for each area in the document image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus,
a display panel configured to display a document image as plural divisional areas obtained by dividing the document image by predetermined divisional numbers in primary and secondary scanning directions;
a touch panel on the display panel;
a controller;
a glossiness setting unit, running on said controller, configured to change, in accordance with a user operation to the touch panel, a glossiness setting of the divisional area that includes a position where the user operation was detected by the touch panel; said user operation comprising the user touching one of the divisional areas for a period of time; wherein said glossiness setting unit changes a level of the glossiness setting for the divisional area in accordance with the period of time that the user touched the divisional area;
a printing device configured to fix a toner image corresponding to the document image on a printing paper sheet; and
a print control unit, running on said controller, configured to cause the printing device to fix the toner image under a fixation condition corresponding to the glossiness settings of the plural divisional areas.

2. The image forming apparatus according to claim 1, wherein the glossiness setting unit (a) determines object types of the plural divisional areas, determines default glossinesses corresponding the determined object types, and causes the display panel to display the plural divisional areas in displaying manners corresponding to the determined default glossinesses, (b) changes, in accordance with a user operation to the touch panel, a glossiness setting from the default glossiness of the divisional area that includes a position where the user operation was detected by the touch panel, and (c) causes the display panel to display the plural divisional areas in displaying manners corresponding to the changed glossiness settings.

3. The image forming apparatus according to claim 1, wherein the print control unit sets a primary-scanning-directional fixation temperature distribution corresponding to the glossiness settings of the divisional areas arranged along the primary scanning direction, and causes the printing device to fix the toner image on the printing paper sheet with the fixation temperature distribution.

\* \* \* \* \*